United States Patent [19]

Slezinger et al.

[11] 4,073,188

[45] Feb. 14, 1978

[54] WIND TUNNEL

[76] Inventors: Isaak Isaevich Slezinger, ulitsa Kirova, 40a, kv. 41; Gennady Fedotovich Babkin, ulitsa Tuchkovskaya, 9, kv. 13; Samuil Matusovich Gorlin, Leninsky prospekt, 78, kv. 161; Regina Valentinovna Belyaeva, Teply Stan, 3 mikroraion, korpus 40, kv. 127, all of Moscow, U.S.S.R.

[21] Appl. No.: 754,679

[22] Filed: Dec. 27, 1976

[30] Foreign Application Priority Data

Dec. 30, 1975 U.S.S.R. .............................. 2306498

[51] Int. Cl.² .............................................. G01M 9/00
[52] U.S. Cl. ......................................... 73/147; 73/117
[58] Field of Search ........................... 73/147, 117, 146

[56] References Cited

U.S. PATENT DOCUMENTS 3,057,192  10/1962  Huffman et al. ..................... 73/117

FOREIGN PATENT DOCUMENTS 1,293,164  4/1962  France ................................. 73/147

Primary Examiner—Donald O. Woodiel
Attorney, Agent, or Firm—Lackenbach, Lilling & Siegel

[57] ABSTRACT

The wind tunnel for testing a transport vehicle comprises rotary drums mounted on a base with their bearing surfaces located in the working chamber of the wind tunnel, essentially level with its floor, and a wind tunnel balance located in the zone of the rotary drums and comprising a frame which is linked mechanically with dynamometers secured to the base and a supporting platform. The frame is located at the outer sides of the rotary drums, somewhat below their bearing surfaces so that said rotary drums are inside said frame, and is connected with at least three horizontal links whose ends are articulated with the base via vertical links of which one is directed up and the other down. The supporting platform is located in the working chamber of the wind tunnel and mounted on the frame so that it can turn around a vertical axis during the test of the transport vehicle on the wind tunnel balance and be removed during the test of the transport vehicle on the rotary drums. This design of the wind tunnel is characterized by the comparatively small length of the working chamber.

4 Claims, 9 Drawing Figures

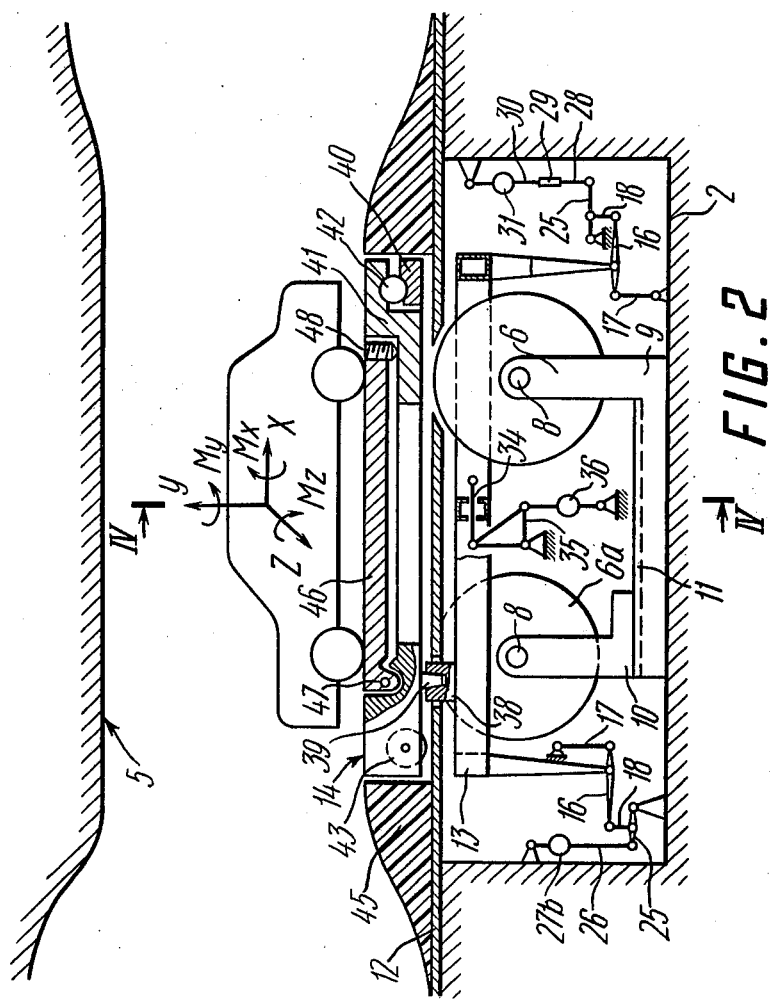

WIND TUNNEL

The present invention relates to wind tunnels for testing transport vehicles.

The wind tunnel made in accordance with the present invention will be used most efficiently for testing automobiles, i.e. for determining the aerodynamic forces and moments acting on said automobiles.

Known in the prior art are wind tunnels for testing automobiles wherein on a rigid base, which are several rotary drums, arranged one after another in the direction of the air stream and provided with a measuring system, and a wind tunnel balance are mounted.

The rotary drums are installed so that their bearing surfaces (i.e. the surfaces supporting the wheels of the automobile being tested) are located in the working chamber of the wind tunnel and are level with its floor.

The wind tunnel balance comprises a frame mounted on a rigid base by means of supporting rollers. Located on this frame on hydraulic cushions is a supporting platform for the automobile under test. The supporting platform is connected by a system of levers with dynamometers installed on the frame. The system of levers together with the dynamometers constitutes a system for measuring aerodynamic forces and moments.

The frame together with the supporting platform and the system for measuring the aerodynamic forces and moments is installed on the base with a provision for turning around a vertical axis for changing the drift angle of the automobile.

In the wind tunnel described above the rotary drums and the balance are arranged along its working chamber which increases its length and, in turn, increases the aerodynamic losses, calls for a higher power of the tunnel drive and thus raises the operating expenses. Besides, in the long working chamber it is difficult to ensure a uniform air stream throughout its length which distorts the test conditions as compared with the real conditions.

Also known in the prior art is a wind tunnel balance wherein the supporting platform rests on horizontal links.

The ends of each horizontal link are articulated with the ends of vertical links of which one is directed upward and the other directed downward. The other ends of the vertical links are articulated to the base. The supporting platform is mechanically linked with a dynamometer fixed on the base. This balance is adapted for measuring the aerodynamic forces and moments acting in only one horizontal plane.

An object of the present invention lies is to provide a wind tunnel with a balance whose design would reduce considerably the length of the working chamber of said tunnel.

Another object of the present invention is to reduce the capital expenditures for constructing the wind tunnel and its power plant.

Still another object of the present invention is to cut down the consumption of energy for operation of the wind tunnel.

A further object is to improve the uniformity of the stream in the working chamber of the wind tunnel which will bring the test conditions closer to the real conditions of automobile service.

According to these and other object we hereby provide a wind tunnel for testing a transport vehicle comprising rotary drums, which are mounted on a base with their bearing surfaces located essentially level with the tunnel floor, and a wind tunnel balance whose supporting platform is located in the working chamber of the wind tunnel wherein. According to the invention, the wind tunnel balance is located in the zone of the rotary drums and comprises a frame which is mechanically linked with base-mounted dynamometers, is located at the outer sides of the rotary drums somewhat below their bearing surfaces, so that the rotary drums are located inside said frame, and is connected with at least three horizontal links whose ends are articulated with the base via upward and downward directed vertical links. The supporting platform is mounted on the frame so that it can turn around a vertical axis during the test of the transport vehicle on the wind tunnel balance and be removed during the test of the transport vehicle on the rotary drums.

It is expedient that one of the vertical links of each horizontal link should be connected by a system of levers with a dynamometer secured to the base.

The connection of the vertical links with the dynamometers makes it possible to use the wind tunnel balance for measuring not only the two forces and one moment acting in a horizontal plane, but also the remaining three components of the total aerodynamic force and the total aerodynamic moment.

It is practicable that the point of connection between the frame and each horizontal link should be displaced from its middle and that the vertical links should be of different lengths, said lengths being selected from the relation:

$$| a/l - b/L | = 0.01 \text{ to } 0.1$$

where:
- $a, b$ = distances from the point of connection between the horizontal link and the frame to the point of its connection with the corresponding vertical link; and
- $l, L$ = lengths of vertical links.

Selection of the lengths of the vertical links and of the sections of the horizontal link from the above relation reduces the measurement errors on changes in the temperature conditions in the wind tunnel.

Different lengths of the vertical links increase the sensitivity of the wind tunnel balance during measurements of the horizontal components of the aerodynamic force and moment.

It is possible to install a deck on the supporting platform with a provision for inclining it relative to said supporting platform.

The installation of said deck allows the transport vehicles to be tested at various angles between their longitudinal axis and the direction of the air stream which corresponds to the movement of the transport vehicle under different loads on its front and rear wheels.

The wind tunnel for testing a transport vehicle according to the present invention is characterized by a comparatively small length of the working chamber and provides for measuring all six components of the aerodynamic forces and moments in a uniform air stream. Moreover, the wind tunnel according to the present invention reduces the expenditures for its construction and the power of its drives and, correspondingly, decreases the operating expenses as compared with the known wind tunnels.

Now the invention will be described by way of example with reference to the accompanying drawing, in which:

FIG. 2 is an enlarged view of area I in FIG. 1, showing the first version of the supporting platform;

Figure 1:
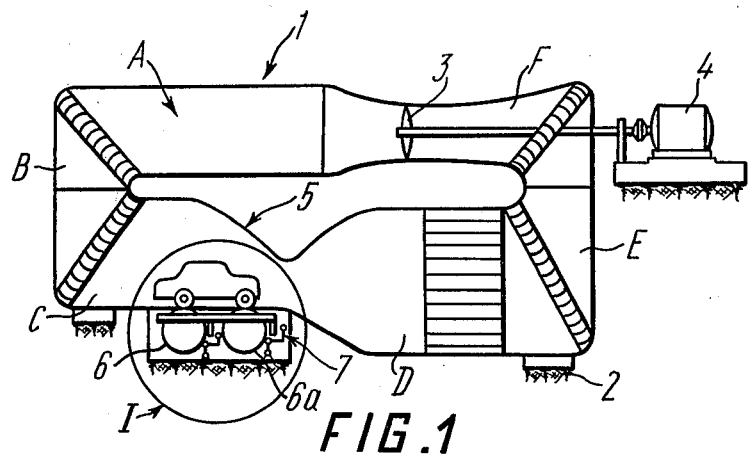
FIG. 1 is a longitudinal section of the wind tunnel according to the invention.

The wind tunnel for testing transport vehicles, i.e. automobiles, comprises a system 1 (FIG. 1) of channels A, B, C, D, E and F installed on a base 2 and a fan 3 with a drive 4 intended to create an air stream in the system 1. The system 1 of channels has a working chamber 5 to accommodate an automobile during the tests. The working chamber 5 is located between channels C and D.

Mounted under the working chamber 5 of the system 1 of channels are rotary drums 6 and 6a and a wind tunnel balance 7.

In addition, the wind tunnel comprises a system of coolers and heaters (not shown in the drawings) for changing the temperature of the air flowing around the vehicle.

Figure 3:
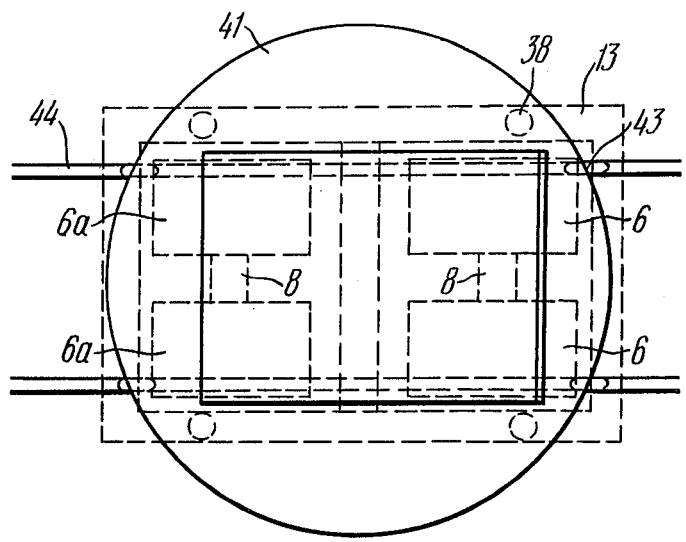
FIG. 3 is a top view of the platform shown in FIG. 2.
Figure 4:
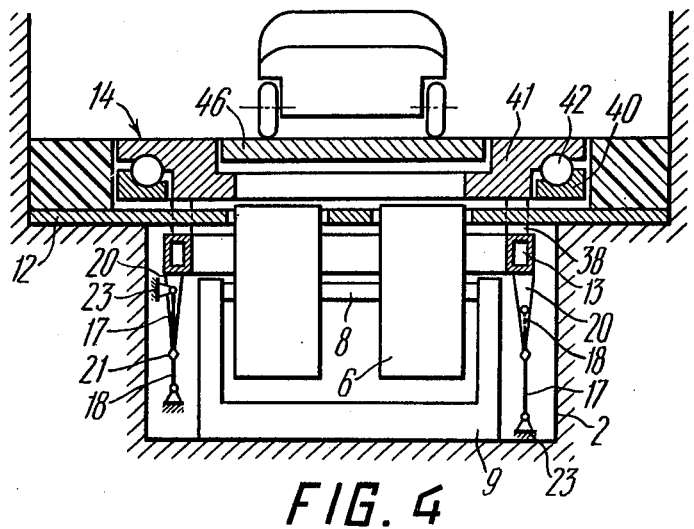
FIG. 4 is a cross sectional view taken along the line IV—IV in FIG. 2.

The axle 8 (FIGS. 2, 3 and 4) of the rotary drum 6 is mounted in the bracket 9 (FIGS. 2 and 4), which is rigidly fixed on the base 2, and the axle 8 of the rotary drum 6a is installed in the bracket 10 (FIG. 2) which rests on the guides 11 made in the bracket 9. This installation of the rotary drums 6 and 6a makes it possible to change the distance between the axles 8 to suit the different types of automobiles under test. The rotary drums 6, 6a are linked with a dynamometric system which can be of any known design suitable for the purpose and is not shown in the drawings so as not to obscure the essence of the invention. The rotary drums 6 and 6a are mounted in such a manner that their bearing surfaces on which the wheels of the automobile rest during the tests are located in the working chamber of the wind tunnel, and are level with its floor 12. The rotary drums 6 and 6a have a rotation drive (not shown) and a system (not shown) for measuring the power characteristics of the vehicle.

The wind tunnel balance 7 is located in the zone of the rotary drums 6 and 6a and comprises a frame 13 (FIGS. 2 and 3) arranged at the outer sides of the rotary drums 6, 6a, and a supporting platform 14 mounted on said frame 13.

Figure 5:
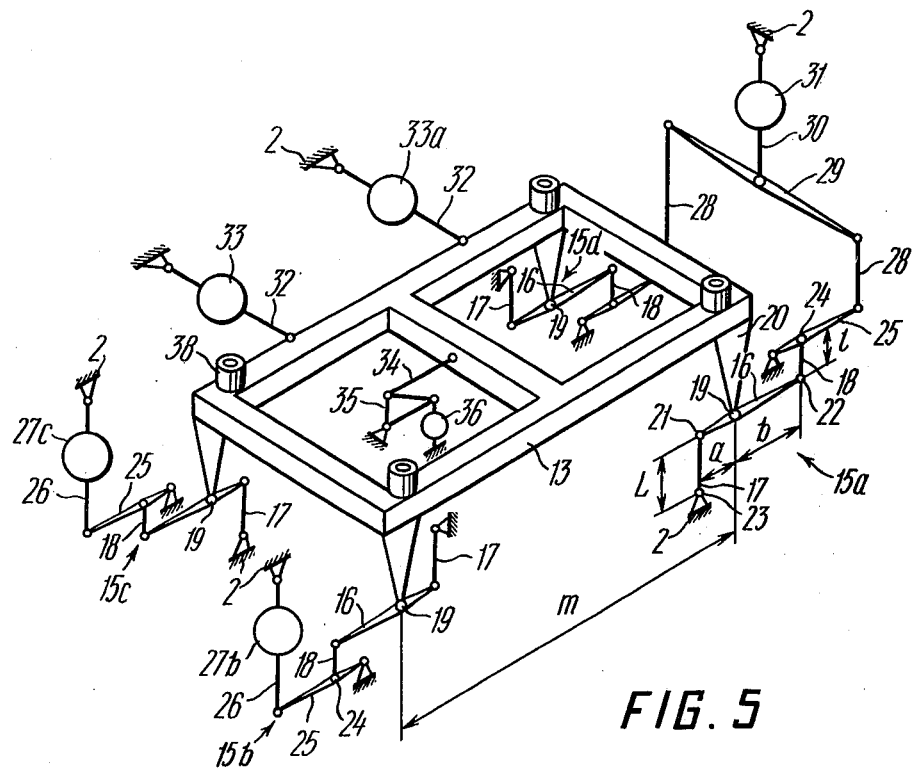
FIG. 5 is a perspective view showing the frame of the wind tunnel balance and its connection with the base.

The frame 13 is made up of interconnected beams forming a closed contour as shown in FIG. 5, said contour accommodating the rotary drums 6 (FIGS. 2 and 3) and 6a with a clearance.

The frame 13 is connected to the base 2 by means of four antiparallelogram mechanisms 15a (FIG. 5), 15b, 15c and 15 d. Each antiparallelogram mechanism 15 comprises a horizontal link 16 and vertical links 17 and 18 of which one is directed upward and the other one directed downward. The brackets 20 of the frame 13 rest on the horizontal links 16 being articulated by hinges 19. The point of connection between the hinge 19 of the frame 13 and the horizontal link 16 is offset from the link's center. The vertical link 17 is connected with the horizontal link 16 by a hinge 21 located at a distance "a" from the hinge 19 and the vertical link 18 is connected with the horizontal link 16 by a hinge 22 located at a distance "b" from the hinge 19. The distances "a" and "b" are selected so as to ensure the relation $b/a > 1.5$.

The vertical links 17 with a length "L" are connected by hinges 23 with the base 2. The vertical links 18 whose length is "l" are connected by hinges 24 with levers 25. Said levers 25 are connected with the vertical links 18 of the anti-parallelograms 15b and 15c; the shorter arms of said levers are articulated to the base 2 while their longer arms are attached to bars 26 which are articulated to the dynamometers 27b and 27c fixed on the base 2.

The levers 25 connected with the vertical links 18 of the antiparallelograms 15a and 15d are articulated by their shorter arms with the base 2 while their longer arms are articulated by means of bars 28 with the summing horizontal lever 29 which is connected by its center-located hinge through a vertical bar 30 with a dynamometer 31, the latter being fastened to the base 2.

In addition, the frame 13 is connected by bars 32 with the dynamometers 33 and 33a fixed to the base 2.

It is also possible to connect the frame 13 with the dynamometers 33 by means of a system of levers.

In addition, the frame 13 is connected to a dynamometer 36 by a bar 34 and an angular lever 35.

Installation of the frame 13 on the antiparallelogram mechanisms 15 whose horizontal links are used as levers with the relation of their arms $b/a > 1.5$ makes it possible to reduce the load applied to the dynamometers 27b, 27c and 31 which, in its turn, simplifies and cheapens the design of the measuring system.

These dynamometers 27b, 27c, 31, 33, 33a and 36 are designed to measure the components of the total aerodynamic force and the total aerodynamic moment. The dynamometer 36 serves for measuring the drag "X" (FIG. 2). The dynamometers 27b, 27c and 31 measure the lift force "Y", lateral moment $M_x$ and longitudinal moment $M_z$. The dynamometers 33 and 33a measure the lateral force "Z" and the drift moment $M_y$.

In order to relieve the dynamometers 27b, 27c and 31 of the weight of the automobile, the frame 13 and the supporting platform 14, they can be additionally connected with the base by means of a system of levers and counterweights (not shown in the drawings for the sake of clarity).

To increase the transmission ratio of the system of levers to reduce the measuring error on changes in the temperature in the wind tunnel, the points of connection of the frame 13 with each horizontal link 16, i.e. the hinges 19, are displaced from the middle of said links and the length of the vertical links 17 and 18 is selected from the relation $$| a/l - b/L | = 0.01 \text{ to } 0.1 \tag{1}$$

where

"a" and "b" = distances from the hinge 19, respectively, to the hinges 21 and 22 connecting the horizontal link 16 with the vertical links 17 and 18; and "L" and "l" = lengths of the vertical links 17 and 18, respectively.

The straight lines in formula (1) stand for the "absolute" value which means that, if the longer bar is directed downward from the horizontal link 16, the left side of the formula has a positive sign, i.e. $a/l > b/L$; conversely, if the longer bar is directed from the horizontal link 16 upward, the sign in the left side of the formula is negative, i.e. $a/l < b/L$.

The criterion for selecting said relation $|a/l - b/L| = 0.01$ to $0.1$ is the reduction of errors in measuring the force of drag acting on the automobile, said errors being caused by the heat expansions of the frame 13. The heat expansion of the frame 13 changes the longitudinal distance "m" (FIG. 5) between the points (i.e. hinges 19) where the frame 13 rests on the horizontal links 16. The change in the distance "m" inclines the initially vertical bars 17 and 18 so that the dynamometer 36 begins to be acted upon by the component $\Delta X$ of the total force of the weight of the automobile, the supporting platform 14 and the frame 13. Inasmuch as the total force of weight can be many times greater than the force of drag "X" of the automobile, it is necessary that said component $\Delta X$ should be negligibly small as compared with the force X. The horizontal component $\Delta X$ acting on each hinge 19 can be found from the formula $$\Delta X = \delta G/a + b(|a/l - b/L|) \quad (2)$$

where
$\delta$ = displacement of the hinge 19 from the position corresponding to the vertical direction of the bars 17 and 18; and
$G$ = the part of the total force acting on the given hinge.

In the real design of the wind tunnel balance the longitudinal distance "m" is about 4 m and G is about 2000 kg. A change of as little as 10° can displace the hinges of the antiparallelograms 15 by approximately 0.5 mm. If the length of the lever $a+b = 500$ mm in formula (2) $\delta G/(a+b) = (0.5 \cdot 2000)/500 = 2$ kgf, hence the condition (1) results in a horizontal component $$\Delta X = 2|0.01 - 0.1| = |0.02 - 0.2| \text{ kgf.}$$

The value of $\Delta X$ is the measuring error of the horizontal force. It follows from the above calculations that this error is very small compared with the maximum force of drag which may reach hundreds of kilogram-force. Selection of parameters $a$, $b$, $l$ and $L$ from formula (1) ensures a maximum sensitivity at a sufficient stability of the frame 13.

Figure 6:
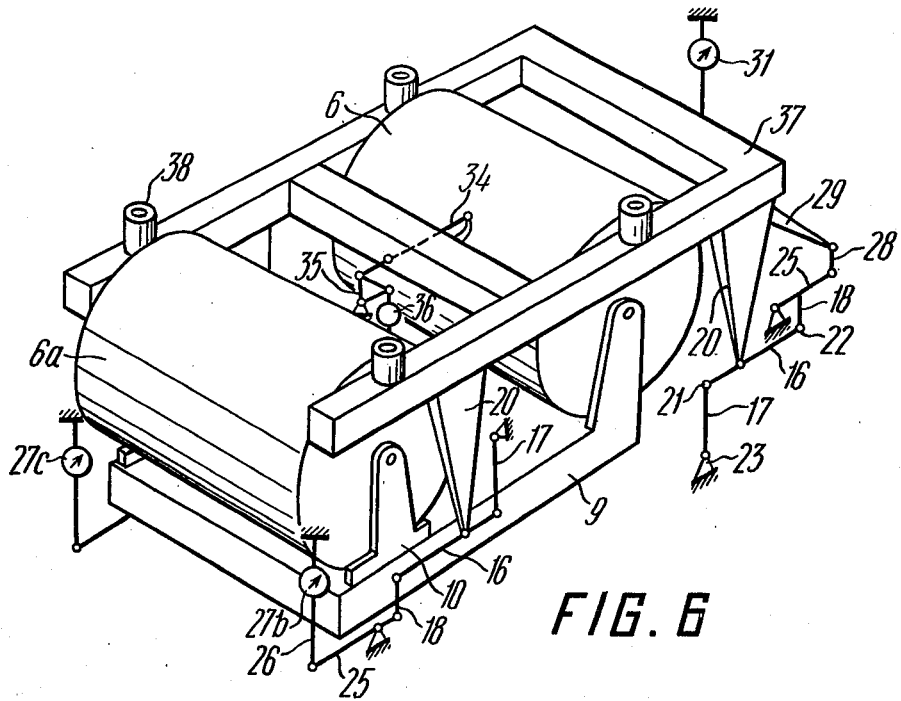
FIG. 6 is a perspective view of the rotary drums and frame of the wind tunnel balance according to the invention.

The frame 13 illustrated in FIG. 5 has the form of a closed contour. However, the frame 37 (FIG. 6) can be an open contour which allows the drum 6a to be moved through a comparatively large distance when so required by changes in the type of the automobile being tested.

The supporting platform 14 (FIG. 2) is mounted on the frame 13 for which purpose the latter has supporting elements 38 with conical holes which receive tapered pins 39 of the supporting platform 14.

The supporting platform 14 consists of two parts 40 and 41 with rolling elements 42 in between. The rolling elements 42 serve to turn the upper part 41 relative to the lower part 40. The turning drive can be constituted by any source of power suitable for the purpose. This turning about the vertical axis is required when the automobile is tested at an angle to the direction of the air stream.

To remove the supporting platform 14 when the vehicle is tested on the rotary drums 6 and 6a, the lower part of said platform is provided with rollers 43 on which the platform 14 moves over the guides 44 (FIG. 3) provided on the floor 12.

To reduce the drag of the supporting platform 14 (FIG. 2), the floor 12 has fairings 45 of porous plastic or of another suitable material. These fairings are fitted on all sides of the supporting platform 14 and are removed when said platform is to be taken off.

Installed on the upper part 41 of the supporting platform 14 is a deck 46 which can be inclined relative to the supporting platform 14 for which purpose said deck 46 is installed on a horizontal axle 47 fixed in the part 41 of the supporting platform 14. A screw mechanism 48 serves for turning the deck 46 in a vertical plane. The deck 46 is used to change the position of the automobile fore and aft axes with respect to the horizontal plane.

Figure 7:
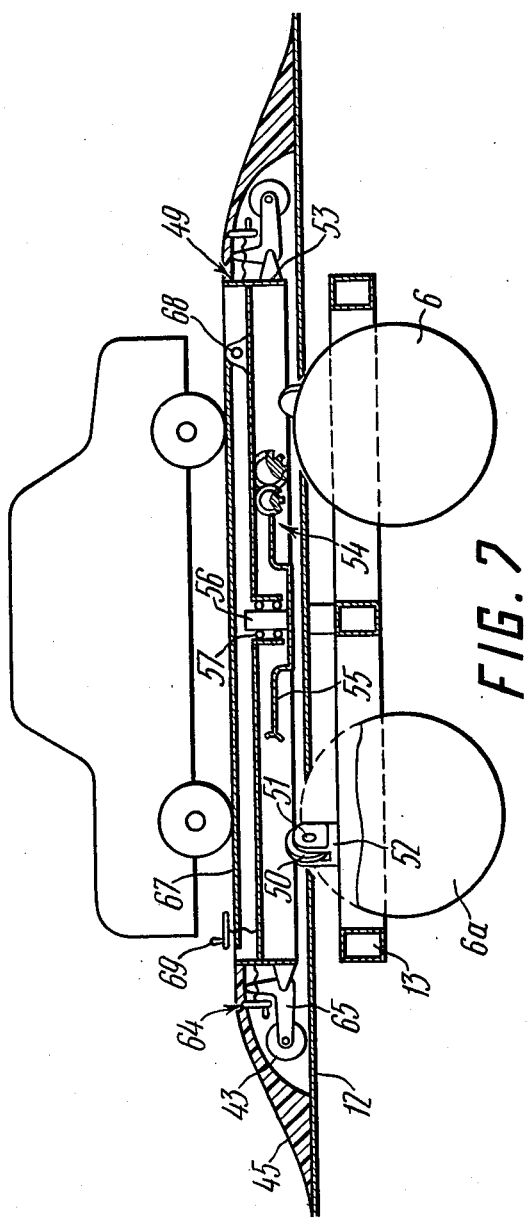
FIG. 7 is a view similar to FIG. 2, but showing another version of the supporting platform and its connection with the frame.
Figure 8:
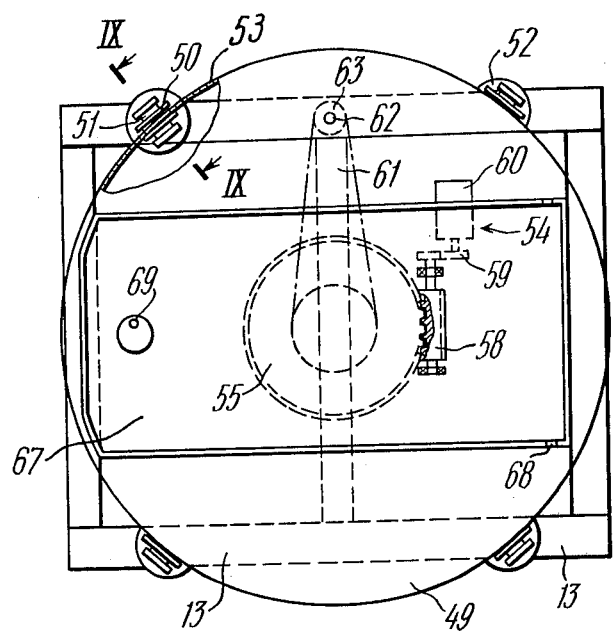
FIG. 8 is a top view, without the automobile, of the platform shown in FIG. 7.
Figure 9:
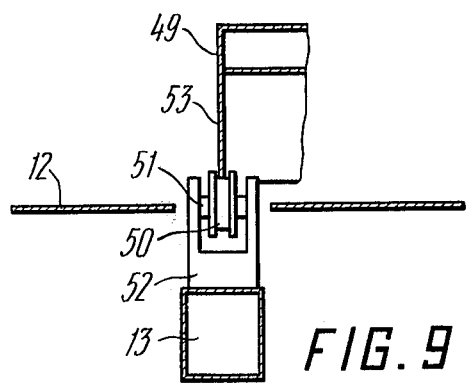
FIG. 9 is a cross sectional view taken along the line IX—IX in FIG. 8.

In another version of the invention the supporting platform 49 (FIGS. 7, 8 and 9) is installed on the frame 13 by means of supporting elements 50 in the form of grooved rollers. Each supporting element 50 is mounted on the axle 51 installed on a bracket 52 which is fixed on the frame 13. A guide 53 running around the supporting platform 49 contacts with the supporting elements 50.

The supporting platform 49 is turned relative to the frame 13 by a drive 54 comprising a worm wheel 55 whose axle 56 is mounted in bearings 57 in the middle of the supporting platform 49. The worm wheel meshes with a worm 58 which is connected by a system of gears 59 with an electric motor 60 installed on the supporting platform 49.

A carrier 61 is rigidly connected to the worm wheel 55 at one end and the other end of the carrier has a pin 62 entering a hole in the bracket 63 fixed on the frame 13.

The rollers 43 on which the supporting platform 49 rolls when it is being removed are installed with a provision for being lifted and lowered vertically with the aid of kinematic nut-and-screw pairs 64 connected with the levers 65 on which the rollers 43 are mounted.

A deck 67 mounted on the supporting platform 49 can be turned around the axle 68 by means of a nut-and-screw pair 69. The purpose of this deck is the same as that of the deck 46 (FIG. 2).

The wind tunnel functions as follows.

The automobile is placed on the rotary drums 6 and 6a and the drive 4 of the fan 3 is turned on. The fan builds up an air stream in the system 1 of channels A, B, C, D, E, F of the wind tunnel. The air stream flows around the automobile whose wheels rest on the bearing surfaces of the rotary drums 6 and 6a.

Then the automobile engine and the rotary drums 6, 6a are started. The peripheral speed of the rotary drums is selected so as to be equal to the velocity of the air stream in the working chamber 5 of the wind tunnel after which the power characteristics of the automobile are determined from the readings of the measuring system. The power is measured by the dynamometric system of the rotary drums together with other parameters (velocity of air stream, drum rotation speed, etc).

For measuring the aerodynamic forces acting on the automobile, the latter is rolled away from the rotary drums and its place is taken by the supporting platform 14 which is rolled on the rollers 43 over the rails 44. After setting the supporting platform 14 with its tapered pins 39 above the holes in the supporting elements 38, the rollers 43 are lifted. The platform 14 goes down so that the tapered pins 39 enter snugly into the holes of the supporting elements 38, thus fixing the lower part 40 of the platform 14 on the frame 13.

In a similar way the version of the supporting platform 49 (FIG. 7) is rolled on the rollers 43 over the rails 44 so that the guide 53 is aligned above the rollers 50 after which the lever 65 is turned by the kinematic screw-and-nut pairs 64. The rollers 43 move upward, the guide 53 of the supporting platform 49 goes down on the rollers 50 and the supporting platform 49 comes in mechanical engagement with the frame 13. Simultaneously, the pin 62 of the carrier 61 enters a hole in the bracket 63 fixed on the frame 13.

After the supporting platform 49 has been installed on the frame 13, the next step is to install the fairings 45 (light foam-plastic panels) on the floor 12 of the working chamber 5 of the wind tunnel.

The automobile is rolled on the deck 67 of the supporting platform 49 over the ramps formed by the inclined portions of the fairings 45.

The desired angle of the automobile relative to the direction of the air stream in the wind tunnel is set by turning on the electric motor 60 of the drive 54. The motor rotates the worm 58 meshing with the worm wheel 55, said rotation being transmitted by a train of gears 59. In view of the fact that the opposite end of the carrier 61 is secured by its pin 62 on the frame 13, the carrier holds the wheel 55 against rotation. Therefore, when the worm 58 rotates around its axle, it turns together with the latter relative to the axle 56 of the worm wheel 55 (and, as a consequence, relative to the frame 13).

Together with the bearings of the worm 58 secured on the supporting platform 49, the platform proper together with the automobile installed on the deck 46 turns with relation to the axle 56. Should it become necessary to change the angle of attack of the automobile, the deck 67 is turned by the screw-and-nut pair 69 relative to the horizontal axis 68.

The aerodynamic forces acting on the automobile are measured by the dynamometers 27b, 27c, 31, 33, 33a and 36. The weight of the supporting platform 49, the frame 13 and the automobile is taken by the dynamometers 27b, 27c and 31 which are provided with conventional auxiliary devices such as levers and counterweights which balance the components of the weight force acting on these dynamometers. After the weight force has been counterbalanced by these devices, the dynamometer 31 will react only to the aerodynamic lift force "Y" and to the lateral aerodynamic moment Mz while the dynamometers 27b and 27c will react only to the components Y, Mz and Mx.

The dynamometers 33 and 33a react to the lateral aerodynamic force Z and to the drift moment My while the dynamometer 36 reacts to the force of drag X.

Thus, it can be seen from the above description that some of the dynamometers react not to one but to two or even three components of the total aerodynamic force and the total aerodynamic moment. To determine the value of each component, one has to make certain simple calculations. These calculations should better be entrusted to an electronic computer which also can be employed for calculating the corresponding aerodynamic coefficients. For this purpose the electric output signals of all the dynamometers together with the signals of the measuring instruments which determine the parameters of the stream in the working chamber 5 of the wind tunnel can be memorized by the computer or some other intermediate memory device.

It also can be seen from the foregoing description that the wind tunnel according to the invention has a shorter working chamber due to the combination of the rotary drums and balance in one and the same zone which will reduce the construction costs, the power of the drive, coolers and heaters, and the operating expenses.

Besides, installation of the balance frame on the antiparallelogram mechanisms whose horizontal links act simultaneously as one of the levers of the leverage system simplifies and cheapens the design of the wind tunnel balance.

We claim:

1. A wind tunnel for testing a transport vehicle comprising: a base; a system of channels for an air stream mounted on said base; a working chamber of said system to accommodate the transport vehicle under test; a means for creating the air stream in said system; rotary drums, for studying the power characteristics of the transport vehicle under test, mounted on said base so that their bearing surfaces are located in said working chamber and are essentially level with the floor of said working chamber; means for measuring the power characteristics of the transport vehicle mechanically linked with said rotary drums; a wind tunnel balance mounted on said base in the zone of said rotary drums to measure the aerodynamic forces and moments acting on the transport vehicle, said balance including a frame, which is arranged on the outer sides of said rotary drums so that said drums are inside said frame, said frame being located somewhat below the bearing surfaces of said rotary drums, at least three horizontal links connected to said frame, and vertical links having one end articulated with the ends of said horizontal links and the other end articulated with said base, said vertical links connecting each of said horizontal links with said base, one of said vertical links being directed up and the other being directed down; a supporting platform, on which the transport vehicle under test is placed, located in said working chamber and installed on said frame so that it can turn around the vertical axis in the course of tests of the transport vehicle on said wind tunnel balance, said supporting platform being installed on said frame so that it can be removed for testing the transport vehicle on said rotary drums; means for turning said supporting platform; and dynamometers secured on said base and linked mechanically with said frame.

2. A wind tunnel according to claim 1 wherein one of the vertical links of each horizontal link is connected by a system of levers with a dynamometer secured to the base.

3. A wind tunnel according to claim 1 wherein the point of connection of the frame with each horizontal link is offset from the middle of said horizontal link and the vertical links have different lengths selected from the relation $$|a/l - b/L| = 0.01 \text{ to } 0.1$$

where:

$a, b$ = distances from the point of connection of the horizontal link with the frame to the point of connection of the horizontal link with the corresponding vertical link; and $L, l$ = lengths of the respective vertical links.

4. A wind tunnel according to claim 1 wherein a deck, which is capable of being inclined relative to the supporting platform, is mounted on the supporting platform.

* * * * *

UNITED STATES PATENT OFFICE
CERTIFICATE OF CORRECTION

PATENT NO. : 4,073,188
DATED : February 14, 1978
INVENTOR(S) : Isaak Isaevich Slezinger, et al It is certified that error appears in the above-identified patent and that said Letters Patent are hereby corrected as shown below:

Column 1, lines 11-12, change "base, which are several rotary drums," to --base several rotary drums, which are--.

Column 4, line 66, change "-0.01 to 0.1" to -- = 0.01 to 0.1 --.

Column 6, line 21, change "automobile" to -- automobile's --.

Signed and Sealed this

Twentieth Day of March 1979

[SEAL]

Attest:

RUTH C. MASON
Attesting Officer

DONALD W. BANNER
Commissioner of Patents and Trademarks